(12) United States Patent
Deneka et al.

(10) Patent No.: US 9,828,298 B2
(45) Date of Patent: Nov. 28, 2017

(54) CEMENT COMPOSITIONS FOR APPLYING TO HONEYCOMB BODIES

(75) Inventors: Thomas James Deneka, Painted Post, NY (US); Crystal Lynn Michels, Hornell, NY (US); Patrick David Tepesch, Corning, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 1078 days.

(21) Appl. No.: 12/274,972

(22) Filed: Nov. 20, 2008

(65) Prior Publication Data

US 2009/0286041 A1 Nov. 19, 2009

Related U.S. Application Data

(60) Provisional application No. 61/004,843, filed on Nov. 30, 2007.

(51) Int. Cl.
| | |
|---|---|
| *C04B 41/00* | (2006.01) |
| *C04B 28/24* | (2006.01) |
| *C04B 41/85* | (2006.01) |
| *C04B 41/50* | (2006.01) |
| *C04B 38/00* | (2006.01) |
| *C04B 111/00* | (2006.01) |

(52) U.S. Cl.
CPC .......... *C04B 41/5089* (2013.01); *C04B 28/24* (2013.01); *C04B 38/0012* (2013.01); *C04B 41/009* (2013.01); *C04B 41/85* (2013.01); *C04B 2111/00793* (2013.01); *Y10T 428/24149* (2015.01)

(58) Field of Classification Search
CPC combination set(s) only.
See application file for complete search history.

(56) References Cited

U.S. PATENT DOCUMENTS

| 5,269,845 A | 12/1993 | Grunau et al. ................ 106/692 |
| 5,565,394 A | 10/1996 | Lachman et al. .............. 502/64 |
| 5,633,217 A | 5/1997 | Lynn ............................. 502/439 |

(Continued)

FOREIGN PATENT DOCUMENTS

| CN | 1376185 | 10/2002 |
| CN | 1636668 | 7/2005 |

(Continued)

OTHER PUBLICATIONS

Yokoyama et al., "Rheological Properties of Fumed Silica Suspensions in the Presence of Potassium Chloride", Jan. 10 2007, Japanese Journal of Applied Physics, vol. 46, No. 1, pp. 328-332.*

(Continued)

*Primary Examiner* — Humera Sheikh
*Assistant Examiner* — Lucas Wang

(57) ABSTRACT

Disclosed are cement compositions for applying to honeycomb bodies as a plugging cement composition, segment cement, or even as an after-applied artificial skin or coating. The cement compositions generally comprise an inorganic powder batch mixture; an organic binder; a liquid vehicle; and a gelled inorganic binder. Also disclosed are honeycomb bodies having the disclosed cement compositions applied thereto, and methods for making same.

22 Claims, 4 Drawing Sheets

(56) References Cited

U.S. PATENT DOCUMENTS

| | | | |
|---|---|---|---|
| 5,660,621 A * | 8/1997 | Bredt | 106/287.34 |
| 5,925,308 A | 7/1999 | Fewkes et al. | 264/623 |
| 6,209,357 B1 | 4/2001 | Bhandarkar et al. | 65/395 |
| 6,342,560 B1 | 1/2002 | Okel | |
| 7,147,725 B2 | 12/2006 | Dallam et al. | |
| 7,691,167 B2 | 4/2010 | Tokumaru | |
| 2001/0003358 A1* | 6/2001 | Terase et al. | 252/62 |
| 2003/0146538 A1* | 8/2003 | Sambrook et al. | 501/1 |
| 2004/0161373 A1* | 8/2004 | Ichikawa et al. | 422/180 |
| 2005/0079016 A1* | 4/2005 | Greenwood | C04B 28/26 405/266 |
| 2005/0079975 A1* | 4/2005 | Fujita | 502/439 |
| 2005/0159308 A1 | 7/2005 | Bliss et al. | 502/439 |
| 2005/0169818 A1* | 8/2005 | Ohno et al. | 422/177 |
| 2006/0051556 A1* | 3/2006 | Ohno et al. | 428/116 |
| 2008/0006972 A1 | 1/2008 | Ichikawa | |
| 2009/0239030 A1* | 9/2009 | Cai et al. | 428/116 |
| 2009/0297764 A1* | 12/2009 | Beall et al. | 428/116 |

FOREIGN PATENT DOCUMENTS

| | | |
|---|---|---|
| CN | 1859962 | 11/2006 |
| JP | 2005/154202 | 6/2005 |
| JP | 2003/155908 | 3/2006 |
| JP | 2006/326574 | 7/2006 |
| JP | 2010/012415 | 1/2010 |
| WO | 199324425 | 12/1993 |
| WO | 2006/117899 | 9/2006 |
| WO | 2007/119407 | 10/2007 |

OTHER PUBLICATIONS

R. L. Rusher, "Strength Factors of Ceramic Shell Molds", Cast Metals Research Journal, 10[4] 149-153 (1974), 11[1] 21-26 (1975).

Nguyen, My H., "Synthesis of oxide powders by way of a polymeric steric entrapment precursor route", Journal of MaterialsResearch,14[8] 3417-3426 (1999).

Ismael, M.R., et al., "Colloidal silica as a nanostructured binder for refractory castables", Refractories Applications and News, vol. 11, No. 4, 2006, pp. 16-20.

European application No. 08853212.2, dated Aug. 4, 2010, Communication, 4 pgs.

Chinese application No. 200880125985.4, dated Jul. 30, 2012, "Notice on the first office action", 7 pgs.

Chinese application No. 200880125985.4, dated Mar. 11, 2013, "Notice on the second office action", 7 pgs.

PCT application No. PCT/US2008/013010, dated Feb. 18, 2009, International Search Report, 2 pgs.

Japanese application No. 2010-535975, dated Apr. 30, 2013, Notification of reasons for rejection, 4 pgs.

Pilate, P., "Refractory Castables: an Overview", Part I: Fundamentals, Ceramic Forum International, 2007, 84(6): E43-E49.

German, Randall M, "Injection Molding of Metals and Ceramics", 1997, Figure 7.4, p. 181.

European Application No. 08853212.2: filed Jun. 14, 2010, European Patent Office Communication dated Nov. 3, 2016, pp. 1-7.

* cited by examiner

CEMENT COMPOSITIONS FOR APPLYING TO HONEYCOMB BODIES

RELATED APPLICATIONS

This application claims the benefit of U.S. Provisional Application No. 61/004,843, filed Nov. 30, 2007, entitled "Cement Compositions for Applying to Honeycomb Bodies."

TECHNICAL FIELD

The disclosure relates to porous honeycomb ceramics and methods of making, and more particularly to improved cement compositions and processes for applying cement to honeycomb articles.

BACKGROUND

The production of honeycomb articles, such as diesel particulate filters, often involves the application of ceramic cements (otherwise referred to as pastes or sealants) onto preformed honeycomb bodies. These cement compositions may be applied to form plugs, artificial skin (otherwise referred to as after-applied skin), or even to bond several smaller honeycomb segments together to make a larger honeycomb article. A common component of these cement compositions is colloidal silica. Colloidal silica is advantageous because it has low thermal expansion, provides strength without heating to high temperatures, and yet maintains strength at high temperatures (over 1000° C.). To that end, a conventional cement composition can consist of one or more ceramic powders, a liquid vehicle such as water, a water soluble polymer, typically methylcellulose, and an inorganic binder, typically the colloidal silica. The water and methylcellulose control the rheology of the paste and the colloidal silica is the inorganic binder that provides strength after the water is removed by drying and the methylcellulose is removed either by a heat-treatment step before use, during subsequent processing steps (such as washcoating), or during use.

One drawback associated with the use of colloidal silica recognized by the inventors is the migration of the very small silica particles (typically less than 30 nm). The migration can occur during the application of cement as the water which contains the silica particles, is pulled into the pores of the cellular ceramic honeycomb body by capillary forces and during drying, going from saturated to funicular to pendular pore structure as the water evaporates from the cement. This particle migration can lead to concentration gradients and resulting non-uniform properties of the final plug, artificial skin (higher silica concentration towards the outer, drying surface), or cement. These non-uniformities can lead to relatively lower strength due to lower levels of the colloidal silica binder, or possibly to non-uniform shrinkage. Further, if the cement is being applied to a ceramic composed of micro-cracked material, the colloidal silica particles may enter the micro-cracks which may lead to changed properties near the area of the applied paste. Typically, this change in properties is not desired.

One solution to this problem is to pre-fill the micro-cracks with organic material to prevent the colloidal particles from entering the cracks. This is known as passivation of the micro-cracks. While passivation may prevent property changes due to micro-crack filling, it does not solve the problem of non-uniform properties of the paste itself and also adds at least one process-step to pre-fill the microcracks.

Another issue with cement paste compositions containing colloidal silica is time-dependent rheology of the paste due to the finite-time the colloidal suspensions remain stable. As the colloidal suspension destabilizes, the particles bond together into larger agglomerates/flocs or networks of particles. Typically, this can result in increased yield point and viscosity of the paste over time, which may be undesirable in production settings.

SUMMARY

The disclosure provides compositions that may be applied to honeycomb bodies as a plugging cement composition, segment cement, or even as after applied artificial skins or coatings. In embodiments, the cement compositions may minimize or even prevent microcrack filling of a honeycomb body to which the composition is applied. In other embodiments, the cement compositions may exhibit substantially uniform rheological properties that remain relatively stable, and do not change substantially over time. In still further embodiments, the cement compositions may reduce or even eliminate binder migration from the applied cement composition to the honeycomb body on which it has been applied that can occur during the application and subsequent drying of the applied cement composition.

In embodiments of the disclosure, the cement compositions generally comprise an inorganic powder; an organic binder; a liquid vehicle; and an inorganic binder. In some embodiments the inorganic binder component comprises a gelled inorganic binder.

In yet other embodiments, the disclosure provides a honeycomb body comprising a honeycomb structure defining a plurality of cell channels bounded by cell channel walls, wherein a cement composition, as disclosed herein, is applied to the honeycomb structure. In some embodiments, the honeycomb body comprises an after applied surface coating (e.g., a skin) applied to a peripheral region of the structure, wherein the surface coating is formed from a cement composition disclosed herein. In still other embodiments, at least a portion of the plurality of cell channels of the honeycomb body comprises plugs, wherein the plugs are formed from a cement composition as disclosed herein.

In other embodiments, the disclosure provides a method for manufacturing a honeycomb body, comprising the steps of providing a honeycomb structure defining a plurality of cell channels bounded by cell channel walls; and applying a cement composition to the honeycomb structure. The cement composition comprises an inorganic powder; an organic binder; a liquid vehicle; and a gelled inorganic binder. Once applied, the cement composition can be fired under conditions effective to convert the applied cement composition to a primary crystalline phase ceramic composition.

Additional embodiments of the disclosure will be set forth, in part, in the detailed description, and any claims which follow, or can be learned by practice of the disclosure. The foregoing general description and the following detailed description are exemplary and explanatory only and are not restrictive.

BRIEF DESCRIPTION OF THE DRAWINGS

The accompanying drawings illustrate certain embodiments of the disclosure.

DETAILED DESCRIPTION

Figure 1:
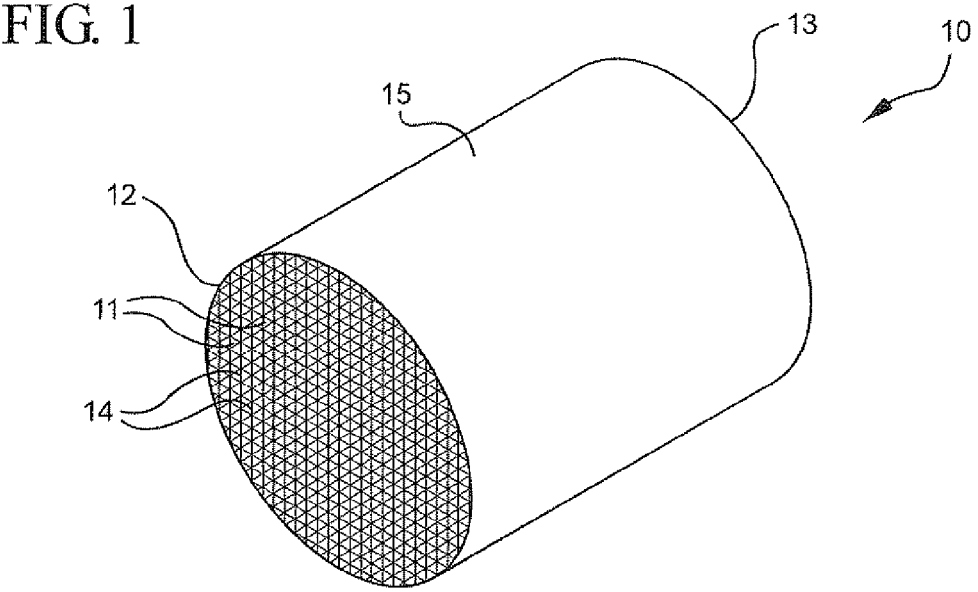
FIG. 1 is an isometric view of porous honeycomb substrate.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not limiting and merely set forth some of the many possible embodiments for the claimed invention.

Disclosed are materials, compounds, compositions, and components that can be used for, can be used in conjunction with, can be used in preparation for, or are products of the disclosed method and compositions. These and other materials are disclosed herein, and when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including any components of the compositions and steps in methods of making and using the disclosed compositions. Thus, if there are a variety of additional steps that can be performed each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means including but not limited to.

The singular forms "a," "an," and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the disclosure includes both embodiments including and excluding the component.

Ranges can be expressed herein as from "about" one particular value, to "about" another particular value, or "about" both values. When such a range is expressed, another embodiment includes from the one particular value, to another particular value, or both. Similarly, when values are expressed as approximations, by use of the antecedent "about," the particular value forms another embodiment. The endpoints of each of the ranges are significant both in relation to the other endpoint, and independently of the other endpoint.

"Weight percent," "wt. %," "percent by weight" or like terms referring to, for example, a component, unless specifically stated to the contrary, refers to the ratio of the weight of the component to the total weight of the composition in which the component is included, expressed as a percentage.

As used herein, a "superaddition" refers to a weight percent of a component, such as for example, a binder, liquid vehicle, or pore former, based upon and relative to 100 weight percent of an inorganic powder batch composition.

As summarized above, the cement compositions of this disclosure generally comprise an inorganic powder batch mixture; an organic binder; a liquid vehicle; and a gelled inorganic binder. The cement compositions can be applied to honeycomb bodies as a plugging cement composition, segment cement, or even as an after-applied artificial skin or coating. In embodiments, the cement compositions may minimize or even prevent microcrack filling of a honeycomb body to which the composition is applied. In other embodiments, the cement compositions may exhibit substantially uniform rheological properties that remain substantially stable and do not change appreciably over time. Accordingly, in addition to the other benefits, this may provide processing advantages. In still further embodiments, the cement compositions may reduce or even eliminate binder migration from the applied cement composition to the honeycomb body on which it has been applied that can occur during the application and subsequent drying of the applied cement composition.

The inorganic powder batch mixture of the disclosed compositions comprises one or more refractory powders. In embodiments, the refractory powders may be, for example, ceramic, i.e., pre-reacted or ceramed, refractory powders. In other embodiments, the refractory powders can be glass powders, or glass-ceramic powders. Still further, in other embodiments the inorganic powder batch mixture can comprise any combination of two or more of the aforementioned refractory powders. Exemplary ceramed refractory powders may include silicon carbide, silicon nitride, cordierite, aluminum titanate, and mullite. In a preferred embodiment, the inorganic powder batch mixture comprises ceramed refractory cordierite powder. According to some embodiment, an exemplary cordierite composition may comprise, on an oxide weight percent basis, about 51% to about 54% $SiO_2$; about 13% to about 18% MgO; and about 28% to about 35% $Al_2O_3$. Exemplary refractory glass powders can include crushed borosilicate glass (such as Pyrex 7761 available from Corning, Inc., of Corning, N.Y. USA).

The refractory powders can have any desired median particle size $D_{50}$, depending upon the desired properties for the resulting composition. According to embodiments, the ceramed refractory powder may have a median particle size diameter $D_{50}$ less than or equal to about 100 micrometers, 90 micrometers, 80 micrometers, 70 micrometers, or even less than 60 micrometers. In still other embodiments, the ceramed refractory powder may have a median particle size diameter $D_{50}$ less than or equal to about 50 micrometers, 40 micrometers, 30 micrometers, 20 micrometers or even 10 micrometers. In still further embodiments, it is preferred that the ceramed refractory powder have a median particle size $D_{50}$ in the range of from about 40 micrometers to about 50 micrometers, including exemplary particle size diameters of about 41, 43, 45, 47 and 49 micrometers.

The compositions further comprise a binder component comprised of an inorganic binder. In some embodiments, the inorganic binder is a gelled inorganic binder such as gelled colloidal silica. According to embodiments, the incorporation of a gelled inorganic binder may minimize or even prevent the migration of the inorganic binder particles into microcracks of a honeycomb body on which the composition is applied. Accordingly, as used herein, the term "gelled inorganic binder" refers to a colloidal dispersion of solid inorganic particles in which the solid inorganic particles form an interconnected network or matrix in combination with a continuous fluid phase, resulting in a viscous semi-rigid material. Further, it should be understood that there can be relative levels or degrees of gelation. To that end, since a colloidal dispersion can comprise smaller solid particles having particle sizes diameters less than 100 nm, a gelled inorganic binder as used herein comprises an interconnected network of the dispersed inorganic particles that is sufficient to prevent at least a portion of the inorganic binder particles from migrating into microcracks of a honeycomb structure upon which the cement composition has been applied.

The gelled inorganic binder may be pre-gelled prior to introducing the inorganic binder into the powder composition. Alternatively, in other embodiments, the inorganic binder can be gelled after it has been combined with one or more other components of the disclosed compositions. For example, in embodiments of the disclosure, the inorganic binder component of the composition can initially comprise a non-gelled colloidal silica which is subsequently gelled after being incorporated into the powdered batch composition. To that end, dispersed-phase inorganic particles within a colloid can be largely affected by the surface chemistry present in the colloid and, as such, in embodiments the gelation of a colloid can be effected by altering the surface chemistry within the colloid.

Accordingly, the non-gelled colloidal silica can subsequently be gelled by the addition of one or more gelling agents to the composition. In embodiments, colloidal silica may be gelled by increasing the ion concentration of the composition. In other embodiments, colloidal silica can be gelled by altering the pH of the composition. Still further embodiments can comprise both increasing the ion concentration and altering the pH of the composition. It should be understood that the gelling agent can be used in any amount effective to provide a gelled inorganic binder as described herein.

Exemplary gelling agents that function to increase the ion concentration of the disclosed composition, i.e., ion increasing gelling agents, include one or more water soluble salts. To that end, exemplary water soluble salts that are suitable gelling agents include magnesium salts such as magnesium chloride, or magnesium acetate, calcium salts such as calcium chloride, or even sodium salts such as sodium chloride. Still further, in embodiments of the invention the use of salts comprising $2^+$ cations, such as Mg and Ca, can be particularly effective to gel an inorganic binder component at relatively low salt concentrations.

As noted above, an inorganic binder such as colloidal silica can also be gelled by altering the pH of the composition. To that end, the pH of the disclosed compositions can be increased or decreased by the use of a pH adjusting gelling agent comprising an acid, a base, or with a combination of an acid and a base. Exemplary pH adjusting gelling agent are acid gelling agents which include, without limitations hydrochloric acid, sulfuric acid, and nitric acid. In still another exemplary embodiment, the acid gelling agent may include organic acids such as citric acid, and acetic acid. Exemplary pH adjusting gelling agent comprising base gelling agents include, without limitation, ammonium hydroxide, sodium hydroxide, and triethanol amine (hereinafter "TEA").

According to embodiments, increasing the ion concentration of the composition by the addition of a salt or salt solution can result in non-uniform gelation due to the non-uniform salt concentrations throughout the composition and particularly at or near the region where the ion increasing gelling agent was introduced. According to these embodiments, a more uniform and controlled gelation may be achieved by a combination of one or more ion increasing gelling agents and one or more pH adjusting gelling agents. For example, the ion concentration of the composition can initially be increased within in a first pH range having a relatively longer gel times. The pH of the composition can then be adjusted to a second pH range exhibiting relatively shorter gel times. Therefore, since some colloidal silica solutions exhibit a minimum gel time as a function of pH, local deviations in pH will not result in any substantially non-uniform gelations.

In embodiments of the disclosure, one exemplary combination of an ion increasing gelling agent and a pH adjusting gelling agent comprises the use of TEA as both a base and a salt in a colloidal silica solution having a relatively high stability at relatively high pH. Exemplary colloidal silicas can include the Ludox HS, AS, and SK, available from W.R. Grace & Company, and can be gelled by increasing the ion concentration by addition of salts and/or by changing the pH. According to this embodiment, TEA can first be added to the colloidal silica, rendering a relatively stable colloidal silica solution. The pH of the solution may then be lowered by the addition of an acid, such as citric acid, followed by thorough mixing and gel formation.

Gelation occurs at lower concentrations for salts with higher valence ions. For example, soluble Mg-salts will gel colloidal suspensions with cation counter-ions (such as Ludox HS, or Ludox AS) at relatively low concentrations compared with Na-salts. The precise concentration required to gel a particular colloidal suspension in a particular time depends on the pH and concentration of colloid and also temperature.

The inventors have found that uniform gelation can be difficult to achieve in short times due to the locally high concentration of salt that occurs near dissolving salt particles, or when concentrated salt solutions are added because the gelation occurs locally around the high concentration areas, leaving ungelled material far from the added salt or salt solution. The inventors have found that the above TEA addition is a particularly useful as a method of gelation for cation stabilized colloids (such as Ludox HS and Ludox AS) because it allows for uniform gel formation without the addition of any inorganic salts (which may be detrimental to the stability of the amorphous silica colloids at high temperatures-1000 C resulting in undesired crystallization). The salt TEA effectively increases the ion concentration in the solution, but maintains the high pH where the gel time is relatively high. The TEA can be added in very high concentrations and homogenously distributed without forming a gel. At this time, other materials can be added at relatively low viscosity (such as the inorganic particles used in the cement) and mixed thoroughly with low energy.

When the mixing is complete, the pH can be reduced into the range of lower gel times by addition of an organic acid such as citric acid (or acetic acid). Other inorganic acids, such as HCl, $H_2SO_4$, and the like may also be used, but are less desirable. Because the gel time goes through a minimum with respect to pH, this allows the addition of the acid in solid form or highly concentrated solutions without the formation of a non-uniform gel. The concentration of TEA and citric acid is chosen such that the gel time upon acid addition is appropriate for the processes. For small sized batches, relatively short gel times can be used, and, thus, relatively high salt concentrations can be used. For larger batches, longer mixing times may require longer gel times, and less salt and acid may be used. The salt and acid concentrations will also depend on the concentration of the colloid and processing temperatures. Lower colloid concentrations will require higher salt/acid concentrations. For a given cements, a few experiments are run to determine the concentrations.

In some embodiments, the binder component may further comprise an organic binder. The addition of the organic binder component can further contribute to the cohesion and plasticity of the composition prior to firing. This improved cohesion and plasticity can, for example, improve the ability to shape the composition. This can be advantageous when utilizing the composition to form skin coatings or when plugging selected portions (such as the ends) of a honeycomb structural body. Exemplary organic binders include cellulose materials. Exemplary cellulose materials include cellulose ether binders such as methylcellulose, hydroxypropyl methylcellulose, methylcellulose derivatives, and/or any combinations thereof. Particularly preferred examples include methylcellulose and hydroxypropyl methylcellulose. Preferably, the organic binder can be present in the composition as a super addition in an amount in the range of from 0.1 weight percent to 5.0 weight percent of the inorganic powder batch composition, or even in an amount in the range of from 0.5 weight percent to 2.0 weight percent of the inorganic powder batch composition.

The preferred liquid vehicle for providing a flowable or paste-like consistency to the disclosed compositions is water, although other liquid vehicles can be used. To this end, the amount of the liquid vehicle component can vary in order to provide optimum handling properties and compatibility with the other components in the batch mixture. According to some embodiments, the liquid vehicle content is usually present as a super addition in an amount in the range of from 15% to 60% by weight of the inorganic powder batch composition, or even according to some embodiments can be in the range of from 20% to 50% by weight of the inorganic powder batch mixture. Minimization of liquid components in the compositions can also lead to further reductions in the drying shrinkage of the compositions during the drying process.

The compositions of the invention can optionally comprise one or more processing aids such as a plasticizer, lubricant, surfactant, sintering aid, rheology modifier, thixotropic agent, dispersing agents, or pore former. An exemplary plasticizer for use in preparing the plugging composition is glycerine. An exemplary lubricant can be a hydrocarbon oil or tall oil. Exemplary commercially available lubricants include Liga GS, available from Peter Greven Fett-Chemie and Durasyn® 162 hydrocarbon oil available from Innovene. A commercially available thixotropic agent is Benaqua 1000 available from Rheox, Inc. A pore former, may also be optionally used to produce a desired porosity of the resulting ceramed composition. Exemplary and non-limiting pore formers can include graphite, starch, polyethylene beads, and/or flour. Exemplary dispersing agents that can be used include the NuoSperse® 2000 from Elementis and ZetaSperse® 1200, available from Air Products and Chemicals, Inc.

In still other embodiments of the disclosed compositions, the gelation of colloidal silica can result in compositions having rheological properties which may benefit from further modification. For example, the compositions may be too thick for an intended use or may have low solids loadings resulting in the formation of pinholes or shrinkage during drying. While such rheology can be desirable and advantageous in some applications, the addition of a rheology modifier as noted above can be used to further control the rheology of the composition. To that end, in embodiments, a preferred rheology modifier is polyvinyl alcohol (PVOH). Both cold-water and hot-water soluble polyvinyl alcohol may be used. Compositions comprising polyvinyl alcohol can exhibit relatively lower viscosity at relatively higher solids loading, while still preventing the colloidal particles from migrating into micro-cracks of the honeycomb body on which the composition is applied. When used, the polyvinyl alcohol can first be mixed with the colloidal silica and, optionally the ceramed refractory powder prior to the addition of the gelling agent. Compositions comprising the polyvinyl alcohol rheology modifier enable gel formation but without the formation of a full three-dimensional gelled connectivity throughout the composition, resulting in a gelled state that flows relatively easily.

To prepare the cement compositions of the instant invention, the inorganic powder batch mixture as described above can be mixed together with the organic binder, followed by the incorporation of the liquid vehicle and inorganic binder components. As mentioned above, the inorganic binder can be gelled either before or after having been introduced into the cement composition. If the inorganic binder is to be gelled prior to addition to the cement composition, the one or more gelling agents can be added to the inorganic binder, such as for example, a colloidal silica. Alternatively, if the inorganic binder is to be gelled after addition to the cement powder composition, the one or more gelling agents can be introduced directly into the cement composition. Any optional processing aids can also be introduced into the cement composition during or after the liquid addition. However, as noted above, if desired the rheology modifier, such as polyvinyl alcohol can first be mixed with the inorganic binder and, optionally the ceramed refractory powder. Once the desired components are combined, the cement composition can be thoroughly mixed to provide a flowable paste-like consistency to the composition. In an exemplary embodiment, the mixing as described above can be done using a Littleford mixer or a Turbula mixer.

Once formed, the cement compositions disclosed herein can be applied to a honeycomb body or structure defining a plurality of cell channels bounded by cell channel walls. An exemplary honeycomb body 10 is shown in FIG. 1 and includes a plurality of generally parallel cell channels 11 formed by, and at least partially defined by, intersecting cell walls 14 (otherwise referred to as "webs") that extend from a first end 12 to a second end 13. The channels 11 are unplugged and flow through them is straight down the channel from first end 12 to second end 13. Preferably, the honeycomb article 10 also includes an extruded smooth skin 15 formed about the honeycomb structure, although this is optional and may be formed in later processing as an after-applied skin described below. In embodiments, the wall thickness of each cell wall 14 for the substrate can be, for example, between about 0.002 to about 0.010 inches (about 51 to about 254 μm). The cell density can be, for example from about 100 to about 900 cells per square inch (cpsi). In a preferred implementation, the cellular honeycomb structure can consist of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. As used herein, "honeycomb" refers to the connected structure of longitudinally-extending cells formed of cell walls, having a generally repeating pattern therein.

The honeycomb substrate can be formed from any conventional material suitable for forming a honeycomb body. For example, in one embodiment, the substrate can be formed from a plasticized ceramic forming composition. Exemplary ceramic forming compositions can include those conventionally known for forming cordierite, aluminum titanate, silicon carbide, aluminum oxide, zirconium oxide, zirconia, magnesium, stabilized zirconia, zirconia stabilized alumina, yttrium stabilized zirconia, calcium stabilized zirconia, alumina, magnesium stabilized alumina, calcium stabilized alumina, titania, silica, magnesia, niobia, ceria, vanadia, nitride, carbide, or any combination thereof.

The honeycomb substrate can be formed according to any conventional process suitable for forming honeycomb monolith bodies. For example, in one embodiment a plasticized ceramic forming batch composition can be shaped into a green body by any known conventional ceramic forming process, such as, e.g., extrusion, injection molding, slip casting, centrifugal casting, pressure casting, dry pressing, and the like. Typically, a ceramic precursor batch composition comprises inorganic ceramic forming batch component(s) capable of forming, for example, one or more of the ceramic compositions set forth above, a liquid vehicle, a binder, and one or more optional processing aids including, for example, surfactants, sintering aids, plasticizers, lubricants, and/or a pore former. In an exemplary embodiment, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. Once formed, the green body can be fired under conditions effective to convert the ceramic forming batch composition into a ceramic composition. Optimum firing conditions for firing the honeycomb green body will depend, at least in part, upon the particular ceramic forming batch composition used to form the honeycomb green body.

Figure 2:
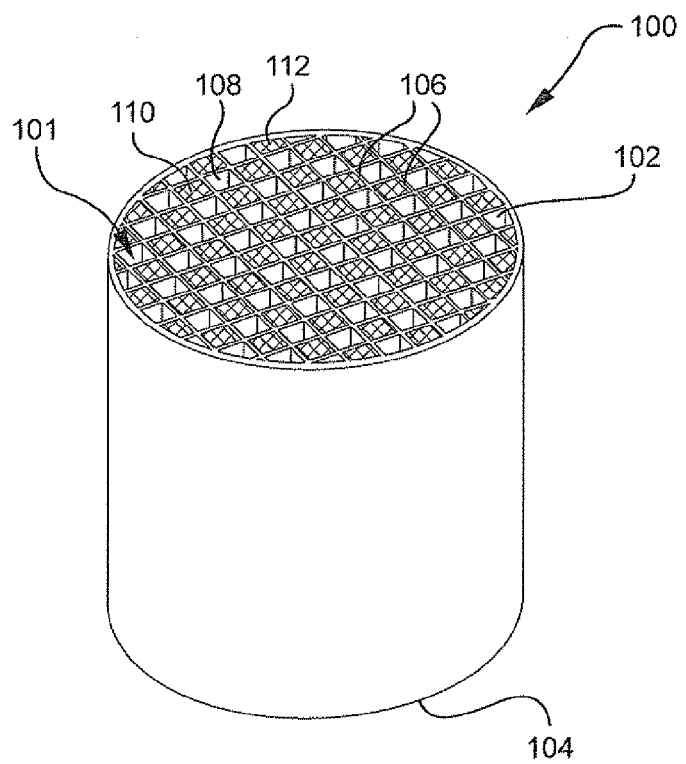
FIG. 2 is an isometric view of porous honeycomb wall flow filter including some plugged channels.

In some embodiments, the cement compositions disclosed herein can be used as plugging cements to plug selected channels of a honeycomb body in order to form a wall flow filter. For example, in a honeycomb structure defining a plurality of cell channels bounded by porous cell channel walls as shown in FIG. 2, at least a portion of the plurality of cell channels can comprise plugs, wherein the plugs are formed from a cement composition as disclosed herein. In some embodiments, a first portion of the plurality of cell channels can comprise a plug sealed to the respective channel walls at or near the downstream outlet end to form inlet cell channels. A second portion of the plurality of cell channels can also comprise a plug sealed to the respective channel walls at or near the upstream inlet end to form outlet cell channels. Other configurations having only one end plugged, as well as partially plugged configurations (having some unplugged channels) are also contemplated.

With reference to FIG. 2, an exemplary end plugged wall flow filter 100 is shown. As illustrated, the wall flow filter 100 preferably has an upstream inlet end 102 and a downstream outlet end 104, and a multiplicity of cells 108 (inlet), 110 (outlet) extending longitudinally from the inlet end to the outlet end. The multiplicity of cells is formed from intersecting porous cell walls 106. A first portion of the plurality of cell channels may be plugged with plugs 112 at or near the downstream outlet end (not shown) to form inlet cell channels, and a second portion of the plurality of cell channels may be plugged at or near the upstream inlet end with plugs 112 to form outlet cell channels. This exemplified plugging configuration forms alternating inlet and outlet channels such that a fluid stream flowing into the filter through the open cells at the inlet end 102, then through the porous cell walls 106, and out of the filter through the open cells at the outlet end 104. The exemplified plugged cell configuration can be referred to herein as a "wall flow" configuration since the flow paths resulting from alternate channel plugging direct a fluid stream being treated to flow through the porous ceramic cell walls prior to exiting the filter. Further, the inlet and outlet channels can be any desired shape such as square, triangular, circular, oval, rectangular, octagonal, hexagonal, or the like. However, as shown in the exemplified embodiment of FIG. 2, the cell channels are typically square shape. Additionally, the cross sectional area of the inlet channels may be larger than the outlet channels.

In other embodiments, the disclosed cement compositions are suitable for use in forming an after-applied surface coating or skin on a peripheral region of a honeycomb body or structure. As used herein, "after-applied" skin or coating refers to a non co-extruded skin or surface coating on a peripheral region of an extruded honeycomb body. For example, when honeycomb substrates are extrusion formed, dried, and fired, the resulting body may need to be resized or shaped in order to comply with desired size and shape tolerances for a given end use application. Accordingly, portions of the outer surface of a formed honeycomb body can optionally be removed by known methods such as cutting, sanding, grinding, machining, and the like, in order to obtain a resulting body having a desired shape. After the removal of material from the peripheral portion of the body, the disclosed compositions of the can be applied to the peripheral portion or surface (but not the ends) in order to form an after-applied skin on the honeycomb body. Once the skin coating has been applied, the applied cement compositions can be dried and fired as described herein.

In still other embodiments, the cement composition can be applied as a segment cement in order to join two or more honeycomb bodies or segments of honeycomb bodies together.

Once the cement composition has been applied to the honeycomb structure in a manner as described herein, the cement composition can be dried and fired to convert the cement composition to a primary crystalline phase ceramic composition. The optional drying step comprises first heating the cement composition at a temperature and for a period of time sufficient to at least substantially remove any liquid vehicle that may be present in the cement composition. As used herein, at least substantially removing any liquid vehicle includes the removal of at least 95%, at least 98%, at least 99%, or even at least 99.9% of the liquid vehicle present in the cement composition prior to firing. Exemplary and non-limiting drying conditions suitable for removing the liquid vehicle include heating cement composition at a temperature of at least 50° C., at least 60° C., at least 70° C., at least 80° C., at least 90° C., at least 100° C., at least 110° C., at least 120° C., at least 130° C., at least 140° C., or even at least 150° C. In one embodiment, the conditions effective to at least substantially remove the liquid vehicle comprise heating the cement composition at a temperature in the range of from 60° C. to 120° C. Further, the heating can be provided by any conventionally known method, including for example, hot air drying, RF and/or microwave drying.

The firing conditions suitable for converting the cement composition to a primary crystalline phase ceramic composition include heating the honeycomb with applied cement composition to a peak temperature of greater than 800° C., 900° C., and even greater than 1000° C. A ramp rate of about 120° C./hr during heating may be used, followed by a hold at the peak temperature for a temperature of about 3 hours, followed by cooling at about 240° C./hr.

According to embodiments, the disclosed cement compositions may be suited for use as either "single fire" or "second fire" cements. In a "single fire" or "co-fire" process, the cement composition as disclosed herein is applied to a green or unfired honeycomb body. The conditions effective to fire the cement composition are also effective to convert the composition of the formed green body into a primary crystalline phase ceramic composition. In some embodiments, it can be desirable for the cement composition to exhibit strength, shrinkage, and coefficient of thermal expansion properties substantially equivalent to those of the honeycomb green body. Thus, in some embodiments, the cement composition can for example comprise either the same raw material sources or alternative raw material sources chosen to at least substantially match the drying and firing shrinkage of the green honeycomb.

The conditions effective to single fire the disclosed cement composition and a formed green body will depend upon the composition of the formed honeycomb green body and the firing conditions needed to convert the composition of the green honeycomb body to a ceramic composition. According to some embodiments, a single fire process will comprise firing at a maximum firing temperature in the range of from 1350° C. to 1500° C., and more preferably at a maximum firing or soak temperature in the range of from 1375° C. to 1430° C. The maximum firing or soak temperature can, for example, be held for a period of time in the range of from 5 to 30 hours, including exemplary time periods of 10, 15, 20, or even 25 hours. Still further, the entire firing cycle, including the initial ramp cycle up to the soak temperature, the duration of the maximum firing or soak temperature, and the cooling period can, for example, comprise a total duration in the range of from about 100 to 150 hours, including 105, 115, 125, 135, or even 145 hours.

A second fire plugging process comprises plugging a honeycomb substrate that has already been fired to provide a ceramic honeycomb structure prior to applying the disclosed cement compositions. Therefore, the conditions effective to second fire the disclosed cement composition will generally only depend upon the composition of the cement composition itself. To that end, as noted above, the cement compositions of the present invention can be fired at temperatures greater than 800° C., 900° C., and even greater than 1000° C.

EXAMPLES

To further illustrate the principles of the present invention, the following examples are put forth so as to provide those of ordinary skill in the art with a complete disclosure and description of how the plugging compositions and methods claimed herein are made and evaluated. They are intended to be purely exemplary of the invention and are not intended to limit the scope of what the inventors regard as their invention. Unless indicated otherwise, parts are parts by weight, temperature is ° C. or is at ambient temperature, and pressure is at or near atmospheric.

Example 1

Evaluation of Thermal Expansion

An inventive cement composition (I1) and a comparative cement composition (C1) were compared for their thermal expansion when used to plug honeycomb parts. The specific compositions of the inventive and comparative cement compositions are set forth in Table 1 below.

TABLE 1

| Batch Number | C1 | I1 |
| --- | --- | --- |
| Coarse Cordierite Powder | 100 | 100 |
| Colloidal Silica | 25 | 25 |
| Methocel | 1 | 1 |
| Water | 24 | 24 |
| $MgCl_2$-hydrate | — | 1 |

The inventive cement composition (I1) comprised 1 weight percent super addition of $MgCl_2$-hydrate as a gelling agent to gel the colloidal silica (Ludox HS-40). When evaluated for thermal expansion, it was found that ceramic samples having the inventive cement composition applied exhibited a much lower thermal expansion than those with the comparable cement composition that did not contain the $MgCl_2$ gelling agent applied thereto. The thermal expansion was tested on cast sheet samples of the cement.

Example 2

Evaluation of MOR Strength

A second inventive cement composition (I2) and a second comparative cement composition (C2) were compared for their respective modulus of rupture (MOR) strengths. The specific compositions of the inventive and comparative cement compositions for this example are set forth in Table 2 below.

TABLE 2

| Batch Number | C2 | I2 |
| --- | --- | --- |
| Coarse Cordierite Powder | 80 | 80 |
| Borosilicate Glass | 20 | 20 |
| Colloidal Silica | 25 | 25 |
| Methocel | 2 | 2 |

TABLE 2-continued

| Batch Number | C2 | I2 |
|---|---|---|
| Lubricant | 6 | 6 |
| MgAcetate | — | 1 |

In batch composition I2 of Table 2, the magnesium acetate was initially added as a 5% solution to provide the 1 weight % superaddition. The rheology of the composition was then adjusted with additional 1% solution of magnesium acetate, keeping the magnesium acetate at a 1% concentration relative to the total water addition, including water present in the colloidal silica. The colloidal silica is represented as a 25% superaddition based upon the combined weight of the cordierite powder and the borosilicate glass.

Figure 3:
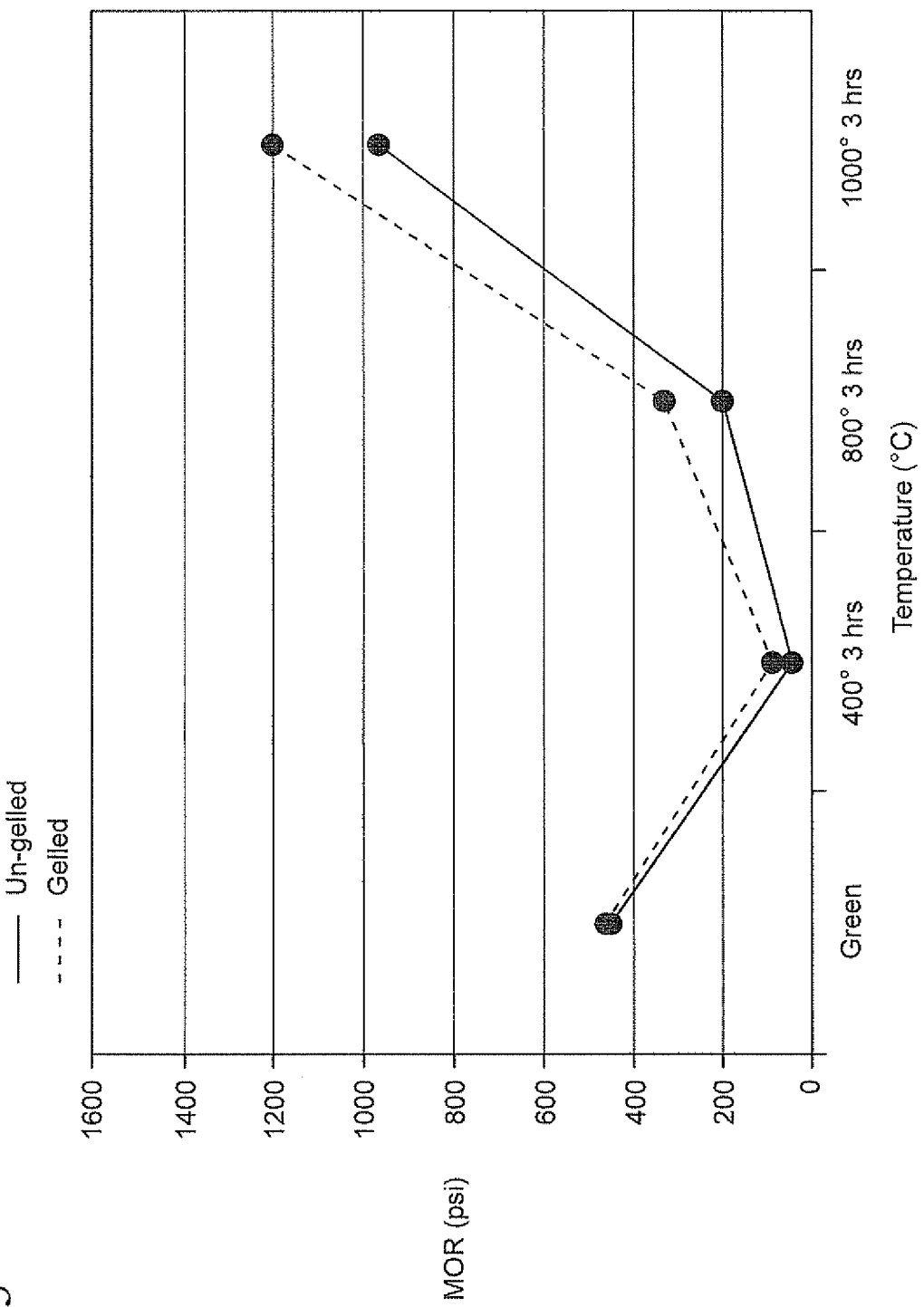
FIG. 3 is a plot of the modulus of rupture strength (MOR) versus temperature (° C.) of plate samples during heating for an inventive cement composition and a comparative cement composition disclosed herein.
Figure 4:
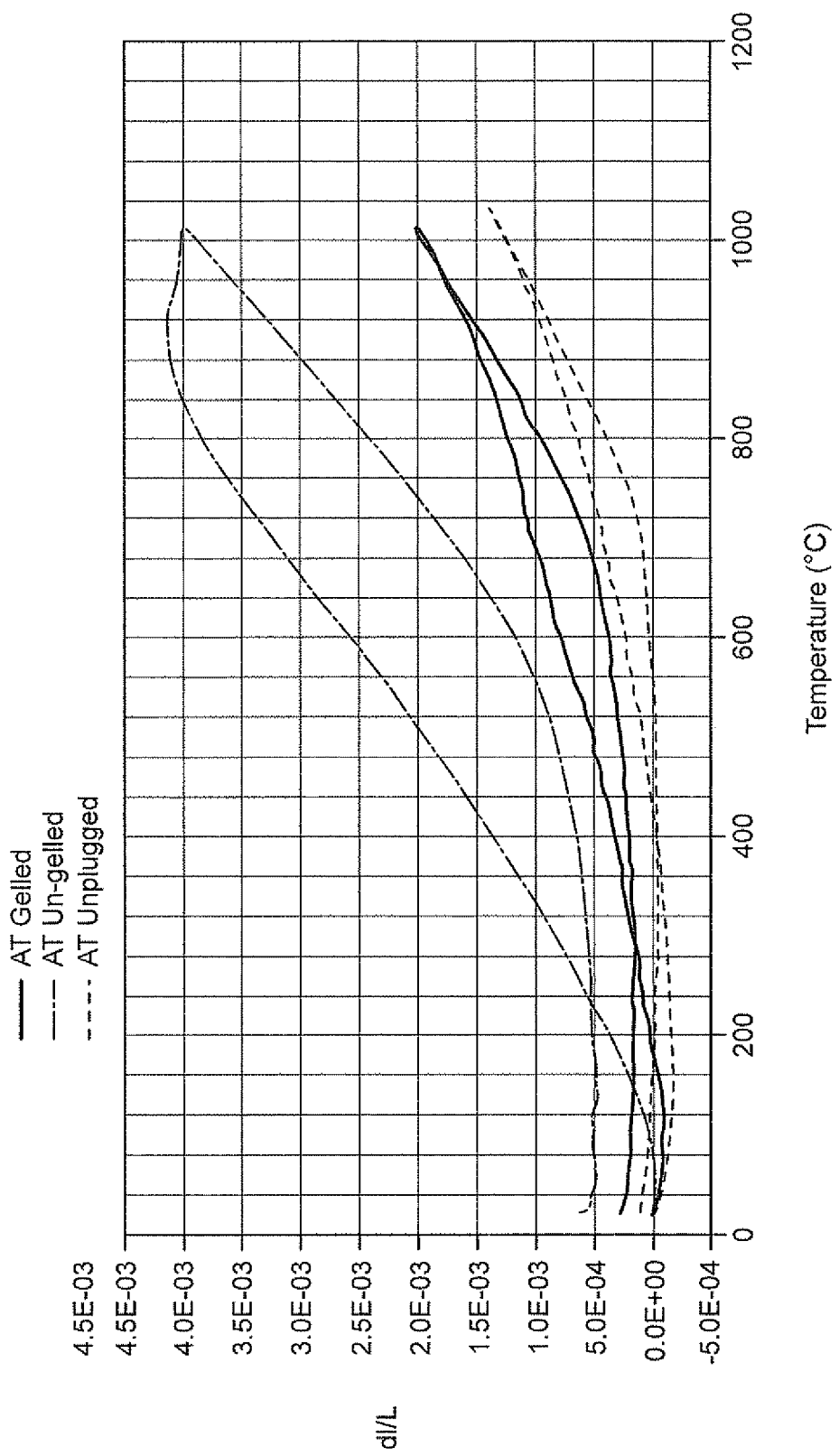
FIG. 4 is a plot of change in length divided by length (PPM) vs. Temperature (° C.) for an aluminum titanate filter plugged with the cement of the invention versus ungelled cement and an unplugged honeycomb sample.
Figure 5:
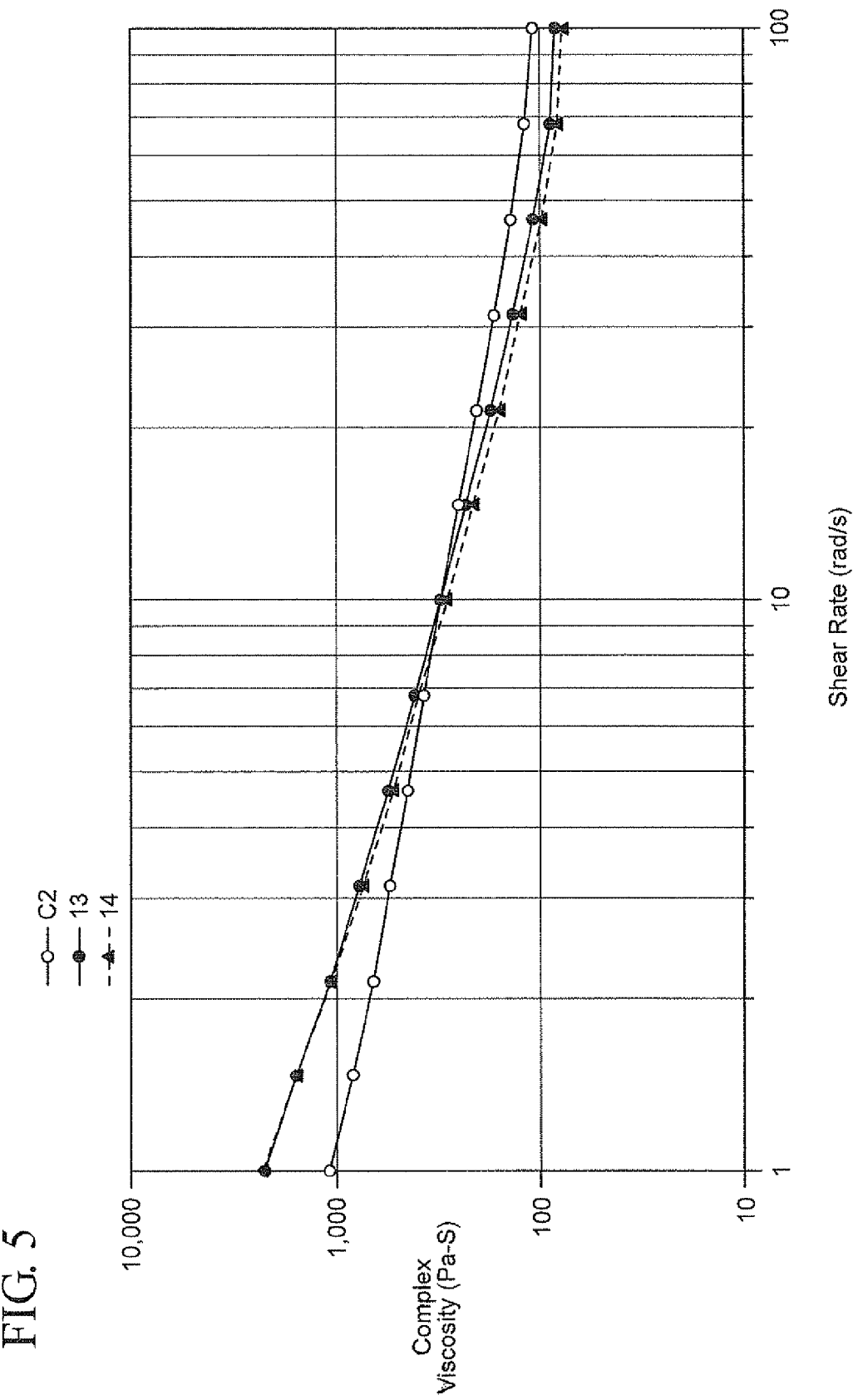
FIG. 5 is a plot of viscosity (Pa-sec) under shear rate (rad/s) for a comparative cement composition (C2) and two inventive cement composition of the disclosure (I3 and I4).

With reference to the data in FIG. 3, it can be seen that the MOR strength of the inventive composition comprising the gelled inorganic binder is unexpectedly higher than the MOR strength of the comparative cement composition without a gelled inorganic binder. The MOR test was performed on a cast sheet of the cement in a four point bend test after being dried and fired.

Example 3

Evaluation of Inventive Cement

Two additional inventive cement compositions (I3 and I4) were prepared and evaluated for yield strength and plugability, i.e., depth uniformity and quality of plug. The specific compositions for inventive cement compositions 13 and 14 are set forth in Table 3 below.

TABLE 3

| Batch Number | I3 | I4 |
|---|---|---|
| 1% PVOH in cordierite powder | 904 g | 904 g |
| Ludox HS-40 | 339.4 g | 339.4 g |
| TEA solution (23.3 wt. % TEA in water) | 210.2 g | 210.2 g |
| Water | 118.4 g | 118.4 g |
| Citric Acid (powder) | 18.2 g | 18.2 g |
| PVOH | 8 | 8 |
| Methocel | 1.06 | 1.06 |
| spindle oil | — | 40 g |

To prepare the inventive cement compositions, the powdered components were first pre-mixed in a Turbula mixer i.e., a mixture of 1% PVOH in cordierite powder, a mixture of 0.1% Methocel in cordierite powder, and a mixture of 1.6% Methocel in cordierite components were first prepared.

The TEA solution was then mixed with the water and subsequently mixed with the Ludox colloidal silica, using high shear beaters. The PVOH/cordierite mixture was then introduced into the liquids and mixed for about 5 to 10 minutes. Following the addition of the PVOH/cordierite mixture, citric acid was then added and mixed for about 3 minutes. After addition of the citric acid, and using low shear beaters, the 0.1% methocel in cordierite mixture and the 1.6% in cordierite mixture was added and mixed. For inventive composition I4, the spindle oil was finally added and allowed to mix until the oil was no longer visible on top of composition. Inventive composition I3 did not contain spindle oil. After addition of the spindle oil (mineral oil), if at all, the mixtures were then completely de-aerated.

Further, each composition was used to plug honeycomb parts and the resulting plugs for both cement compositions exhibited uniform plug depths and were of very high visual quality (no dimples).

TABLE 4

Exemplary Inventive Batch Compositions

| Batch # | Cordierite | PVOH | Methocel | Citric Acid | Ludox HS-40 | TEA Solution | Spindle Oil | Water |
|---|---|---|---|---|---|---|---|---|
| I5 | 100.00% | 0.89% | 0.20% | 2.04% | 37.95% | 23.51% | 4.47% | 13.24% |
| I6 | 100.00% | 0.89% | 2.00% | 2.04% | 37.95% | 23.51% | 4.47% | 13.24% |
| I7 | 100.00% | 0.89% | 4.00% | 2.04% | 37.95% | 23.51% | 4.47% | 22.28% |
| I8 | 100.00% | 0.89% | 2.00% | 2.04% | 37.95% | 23.51% | 4.47% | 19.23% |
| I9 | 100.00% | 0.89% | 2.00% | 2.04% | 37.95% | 23.51% | 4.47% | 31.58% |
| I10 | 100.00% | 0.89% | 0.70% | 2.04% | 37.95% | 23.51% | 4.47% | 6.71% |
| I11 | 100.00% | 0.89% | 1.40% | 2.04% | 37.95% | 23.51% | 4.47% | 6.71% |
| I12 | 100.00% | 0.89% | 0.70% | 2.04% | 37.95% | 23.51% | 4.47% | 13.24% |
| I13 | 100.00% | 0.89% | 1.40% | 2.04% | 37.95% | 23.51% | 4.47% | 13.24% |
| I14 | 100.00% | 0.89% | 1.10% | 2.04% | 37.95% | 23.51% | 4.47% | 13.24% |

As can be seen from the further exemplary embodiments above, a cement composition is provided comprising a combination of an inorganic cordierite ceramic powder (coarse—325 Mesh), an organic temporary binder (methocel), and inorganic binder (colloidal silica—Ludox), a pH adjusting gelling agent (Citric Acid), an ion increasing gelling agent (TEA), and a liquid vehicle (water). The batch may also optionally include a rheology modifier, such as PVOH. The coarse cordierite (325 mesh) in all examples described herein may include a cordierite composition of 41-56% by weight of $SiO_2$, 30-50% by weight of $Al_2O_3$, and 9-20% by weight of MgO. The cordierite powder preferably exhibits a CTE of between $10 \times 10^{-7}/°$ C. and $25 \times 10^{-7}/°$ C. (25-800° C.) when compounded into the inventive cement.

Table 5 below provides an additional exemplary embodiment of the inventive cement composition for application to a honeycomb body. As can be seen the cement composition is comprised a coarse cordierite inorganic powder, an organic binder, colloidal silica, the combination of an ion increasing gelling agent and a pH adjusting gelling agent, and water.

TABLE 5

Exemplary Inventive Batch Compositions

| Batch # | I15 |
|---|---|
| Coarse Cordierite (325 Mesh) | 100.0% |
| Methocel | 1.0% |
| Ludox (HS-40) | 38.0% |
| TEA solution (23.3 wt. % TEA in water) | 23.5% |
| Citric Acid | 2.0% |
| Water | 10.1% |

What is claimed is:

1. A cement composition for applying to a porous microcracked fired ceramic honeycomb body, comprising:
    an inorganic powder, wherein the inorganic powder comprises cordierite;
    an organic binder;
    a liquid vehicle; and
    a gelled inorganic binder comprising gelled colloidal silica,
        wherein the gelled colloidal silica is present in an amount greater than about 9% by weight of the composition and less than about 20% by weight of the composition, calculated on a dry weight basis.

2. The cement composition of claim 1, wherein the inorganic powder batch composition comprises ceramed refractory powder.

3. The cement composition of claim 1, further comprising a gelling agent.

4. The cement composition of claim 3, further comprising a pH adjusting gelling agent.

5. The cement composition of claim 4, wherein the pH adjusting gelling agent comprises an acid, a base, or a combination of an acid and a base.

6. The cement composition of claim 4, wherein the pH adjusting gelling agent comprises an acid selected from hydrochloric acid, sulfuric acid, nitric acid, citric acid, and acetic acid.

7. The cement composition of claim 5, wherein the pH adjusting gelling agent comprises a base selected from ammonium hydroxide, sodium hydroxide, and triethanolamine.

8. The cement composition of claim 3, wherein the gelling agent comprises an ion increasing gelling agent.

9. The cement composition of claim 8, wherein the ion increasing gelling agent comprises a water soluble salt.

10. The cement composition of claim 9, wherein the water soluble salt comprises magnesium, calcium, or sodium.

11. The cement composition of claim 8, wherein the ion increasing gelling agent comprises triethanolamine.

12. The cement composition of claim 1, further comprising a rheology modifier.

13. The cement composition of claim 12, wherein the rheology modifier comprises polyvinyl alcohol.

14. The cement composition of claim 1, wherein:
    the organic binder comprises a cellulose material; and
    the liquid vehicle comprises water.

15. A segmented porous microcracked fired ceramic honeycomb body, comprising:
    at least two porous microcracked fired ceramic honeycomb structures, each structure defining a plurality of cell channels bounded by cell channel walls; and
    a cement composition bonding the at least two fired ceramic honeycomb structures, wherein the cement composition comprises:
        an inorganic powder;
        an organic binder;
        a gelled inorganic binder comprising gelled colloidal silica; and
        a liquid vehicle.

16. A porous microcracked fired ceramic honeycomb body, comprising:
    a porous microcracked fired ceramic honeycomb structure defining a plurality of cell channels bounded by cell channel walls; and
    an after applied surface coating applied to a peripheral region of the porous microcracked fired ceramic honeycomb structure, wherein the surface coating is formed from a composition comprising:
        an inorganic powder;
        an organic binder;
        a gelled inorganic binder comprising gelled colloidal silica; and
        a liquid vehicle.

17. A porous microcracked fired ceramic honeycomb body, comprising:
    a porous microcracked fired ceramic honeycomb structure defining a plurality of cell channels bounded by porous cell channel walls;
    wherein at least a portion of the plurality of cell channels comprise plugs, and wherein the plugs are formed from a cement composition comprising:
        an inorganic powder;
        an organic binder;
        a gelled inorganic binder comprising gelled colloidal silica; and
        a liquid vehicle.

18. The porous microcracked fired ceramic honeycomb claim 17, wherein a first portion of the plurality of cell channels comprise plugs sealed to the respective channel walls at or near a first end and a second portion of the plurality of cell channels comprise plugs sealed to the respective channel walls at or near a second end.

19. A method for minimizing microcrack filling in a porous microcracked fired ceramic honeycomb body, comprising the steps of:
    providing a porous microcracked fired ceramic honeycomb structure defining a plurality of cell channels bounded by cell channel walls; and
    applying a cement composition to the porous microcracked fired ceramic honeycomb structure, said cement composition comprising:
        an inorganic powder;
        an organic binder;
        a gelled inorganic binder comprising gelled colloidal silica; and
        a liquid vehicle.

20. The method of claim 19, further comprising a step of firing the porous microcracked fired ceramic honeycomb structure under conditions effective to form at least one of:
    a ceramic plug in one or more cell channels, and
    a ceramic surface coating about a periphery of the honeycomb structure.

21. The cement composition of claim 1, further comprising gelling agents triethanolamine and citric acid.

22. The cement composition of claim 1, wherein the gelled colloidal silica is present in an amount greater than about 9% by weight of the composition and less than about 15% by weight of the composition, calculated on a dry weight basis.

* * * * *

UNITED STATES PATENT AND TRADEMARK OFFICE
CERTIFICATE OF CORRECTION

| | |
|---|---|
| PATENT NO. | : 9,828,298 B2 |
| APPLICATION NO. | : 12/274972 |
| DATED | : November 28, 2017 |
| INVENTOR(S) | : Thomas James Deneka et al. |

It is certified that error appears in the above-identified patent and that said Letters Patent is hereby corrected as shown below:

In the Claims

Column 15, Line 28, Claim 7, delete "claim 5," and insert -- claim 4, --, therefor.

Column 16, Line 28, Claim 18, delete "claim" and insert -- body of claim --, therefor.

Signed and Sealed this
Eighteenth Day of April, 2023

Katherine Kelly Vidal
*Director of the United States Patent and Trademark Office*